Figure 1:
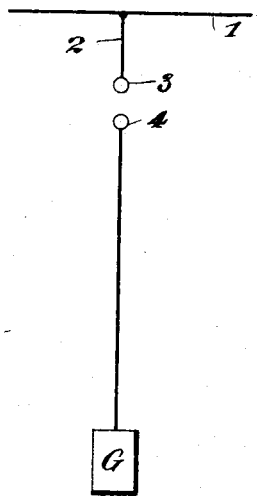

No. 682,714. Patented Sept. 17, 1901.
J. F. KELLY.
MEANS FOR PROTECTING CIRCUITS.
(Application filed June 5, 1901.)

(No Model.)

WITNESSES:

INVENTOR
John F. Kelly.
BY
ATTORNEY

UNITED STATES PATENT OFFICE.

JOHN F. KELLY, OF PITTSFIELD, MASSACHUSETTS.

MEANS FOR PROTECTING CIRCUITS.

SPECIFICATION forming part of Letters Patent No. 682,714, dated September 17, 1901.

Application filed June 5, 1901. Serial No. 63,186. (No model.)

*To all whom it may concern:*

Be it known that I, JOHN F. KELLY, a citizen of the United States, residing at Pittsfield, county of Berkshire, State of Massachusetts, have invented certain new and useful Improvements in Means for Protecting Circuits, of which the following is a full, clear, and exact description.

My invention relates to means for protecting circuits carrying alternating currents from high-frequency charges, such as are due to lightning, such devices being generally known as "lightning-arresters," and has for its object to provide a ready path over which abnormally high frequency alternating charges shall pass, but which shall practically prevent the passage of energy when the system is in normal condition—that is, the arrester is to differentiate between the normal and abnormal current—making an easy path for one and a difficult path for the other. It is based on the peculiar action of a device having capacity, such as a condenser, and a device having self-induction, such as a self-induction coil when the two are in parallel. A condenser is an instrument which allows the more current to flow the higher the frequency, and hence since lightning discharges are currents of a frequency immensely exceeding the highest frequency used for the transmission of energy a condenser placed in shunt to the line will form a relatively easy path for lightning as compared with any normal alternating current used for the transmission of energy. There will, however, be some flow of energy with normal alternating currents through the condenser, and to this there are the objections which are raised to ordinary leakage, &c. This can be largely avoided by the use of a spark-gap of sufficient dimensions interposed between the line and condenser, since at abnormally high frequencies, such as those of lightning, even without any increase of potential on the system the drop across the condenser would be greatly reduced and the potential available for sparking across the gap would be largely increased. We could thus by using a small condenser make a combination in which for normal frequency the condenser would oppose such an effective resistance to the flow of current that an arc could not be maintained across the air-gap, while with an abnormally high frequency the effective resistance of the condenser being vastly reduced sparking across the gap would readily occur. In such a construction, however, any attempt to increase the effectiveness of the lightning-arrester by increasing the size of the condenser would make it easy for both the normal and the abnormal frequency currents to go through, thus making the instrument ineffective for breaking the arc following the lightning discharge across the spark-gap. This difficulty I overcome by shunting the condenser or capacity device by a self-induction coil tuned for the normal frequency with respect to the condenser. When this is done, substantially no current of the normal frequency will flow from the generator to earth through either the condenser or the self-induction coil or, in case they are in local branches, through that portion of the circuit leading to the ground which is common to both the self-induction and the capacity, although the current in both the capacity and self-inductive branches may be large, and this is the case whether the connection to the line is made through a spark-gap or directly. This is due to the fact that since the current through the self-induction lags by 90° and that through the condenser leads by 90° they are in opposition and their sum is zero. If, therefore, any current of normal frequency flows from the line through the ground-wire, it is only because of imperfections in construction or adjustment. If, therefore, an arc is in any way established across the spark-gap—for instance, by means of a high-frequency wave—it would be extinguished inevitably as soon as the starting cause was removed or passed, because the normal frequency would not be able to maintain current enough across the gap to keep up the arc. On the other hand, a high-frequency current such as lightning-current would easily find its way down the capacity branch, the self-induction having practically no neutralizing effect for the high frequency involved. For instance, for a frequency ten times above normal the capacity branch would have only about one-tenth the effective resistance and the self-induction would have about ten times the effective resistance. Consequently the neutralizing effect of the self-induction would be only about one per cent. and for still higher frequencies this neutralization would be still less.

The following is a description of apparatus embodying my invention, reference being had to the accompanying drawings, in which—

Figure 2:
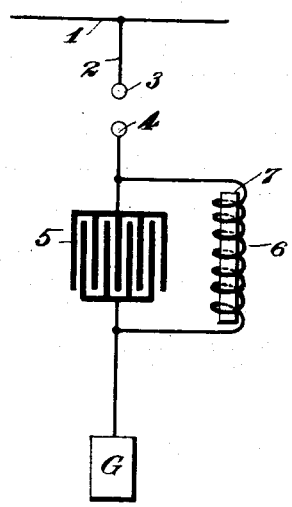
Figure 3:
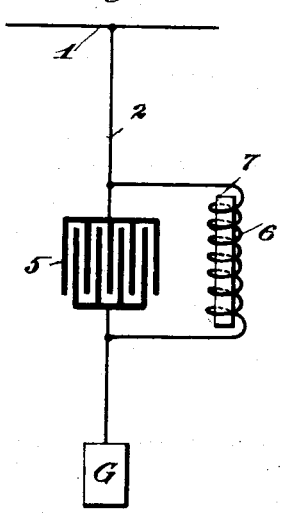
Figure 4:
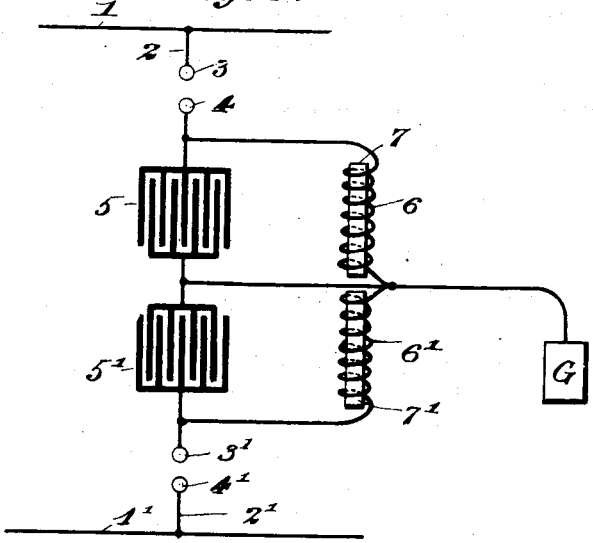

Figure 1 represents the ordinary spark-gap lightning-arrester. Fig. 2 represents my improved arrester with a spark-gap. Fig. 3 represents the same without a spark-gap, and Fig. 4 represents my improvement as applied to both limbs of a circuit.

Referring more particularly to the drawings, 1 represents the main-line conductor, and 2 the branch leading to the ground G, through which the abnormal discharge passes off.

3 and 4 are the electrodes of the spark-gap. In simple arresters, such as that of Fig. 1, the abnormal charge leaps across the gap and goes to earth, the arc ceasing if the current following is not strong enough to maintain it. In systems for the transmission of considerable energy, however, there is danger that the arc will continue, and Figs. 2, 3, and 4 show my means for preventing it. In these figures, 1 is the main, 2 the branch to ground G, and 3 and 4 are the spark-gap electrodes. 5 is a condenser, and 6 is self-induction coil, having a laminated core 7. In Fig. 3 the spark-gap is omitted, and in Fig. 4 the other branch of the main is shown with the extra spark-gap 3' 4' and condenser 5', the self-induction coil 6' with its core 7'. The condensers and the self-induction coils in multiple with them are tuned for the normal frequency of the system, the condenser being of sufficiently large capacity to permit the passage of the energy of a lightning discharge.

In these arresters embodying my invention for normal frequencies there will be no current flowing from the main to the ground, while for very high frequencies there will be an easy path for the discharge. The form I have shown, in which the capacity and self-induction are in separate local branches connected to the main and to the ground by paths from their common points, is the preferred arrangement. I do not, however, intend to limit my invention to what I have shown, but to include all other ways and arrangements in which it can be applied and embodied.

What I claim is—

1. In a system of distribution by alternating currents, in combination, a main conductor, two branches between said main conductor and the earth, possessing capacity and self-induction respectively, and tuned to the normal frequency of the circuit.

2. In a lightning-arrester for alternating-current circuits, the combination of a capacity device and a self-induction device connected in parallel with each other between the main to be protected and the ground, and tuned to the normal frequency of the system to be protected.

3. In a system of distribution by alternating currents in combination, a main conductor, two branches between said main conductor and the earth, and means for displacing the phase of the currents in said branches in opposite directions substantially 90° at normal frequency, and a spark-gap in circuit with said means between the main to be protected and the earth.

4. In a system of distribution by alternating currents, a lightning-arrester forming a path to earth consisting of two branches connected to the main to be protected, one containing a condenser and affording an easy path for lightning discharges and the other a self-induction coil.

5. In a system of distribution by alternating currents, a lightning-arrester constituting a path to ground consisting of two branches connected to the main to be protected, one containing a condenser and the other a self-induction coil, the two branches having a common terminal and a spark-gap in circuit therewith between the main to be protected and the ground.

6. In a lightning-arrester, a capacity device and a self-induction device combined so as to constitute an easy path to earth for high-frequency discharges and to substantially prevent the passage of current at normal frequency.

Signed at Pittsfield this 3d day of June, 1901.

JOHN F. KELLY.

Witnesses:
DAVID B. RUSHMORE,
M. L. NICHOLS.